US012794721B2

(12) United States Patent
Heinecke et al.

(10) Patent No.: US 12,794,721 B2
(45) **Date of Patent: *Nov. 10, 2026**

(54) SYSTEM AND METHOD FOR CREATING AND MAINTAINING IMMUTABILITY, AGREEMENT AND AVAILABILITY OF DATA

(71) Applicant: Blocky, Inc., Bozeman, MT (US)

(72) Inventors: Taylor Heinecke, Bozeman, MT (US); David L. Millman, Bozeman, MT (US); Mike P. Wittie, Bozeman, MT (US)

(73) Assignee: Blocky, Inc., Bozeman, MT (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/961,321

(22) Filed: Nov. 26, 2024

(65) Prior Publication Data

US 2025/0097058 A1 Mar. 20, 2025

Related U.S. Application Data

(63) Continuation of application No. 18/072,574, filed on Nov. 30, 2022, now Pat. No. 12,160,532.
(Continued)

(51) Int. Cl.
*H04L 9/00* (2022.01)
*H04L 9/06* (2006.01)
*H04L 9/32* (2006.01)

(52) U.S. Cl.
CPC .............. *H04L 9/50* (2022.05); *H04L 9/0618* (2013.01); *H04L 9/3297* (2013.01)

(58) Field of Classification Search
None
See application file for complete search history.

(56) References Cited

U.S. PATENT DOCUMENTS 11,038,771 B2 6/2021 Padmanabhan
2020/0076829 A1 3/2020 Wentz
(Continued)

FOREIGN PATENT DOCUMENTS

EP 3609125 B1 2/2020
WO WO-2021/111220 A1 6/2021
WO WO-2021/165755 8/2021

OTHER PUBLICATIONS

Extended European Search Report dated Nov. 11, 2025, 11 pages.
(Continued)

*Primary Examiner* — Raqiul A Choudhury
(74) *Attorney, Agent, or Firm* — Foley & Lardner LLP

(57) ABSTRACT

Systems, methods, and non-transitory computing devices for maintaining immutability. Some methods include creating, by a processor, an alternating structure of a plurality of blocks and a first plurality of timestamp attestations, wherein a first subset of blocks of the plurality of blocks includes a link to at least one of the first plurality of timestamp attestations of at least one preceding block of the plurality of blocks. Creating the alternating structure further includes constructing a first data structure including a first set of ordered transactions and creating a first block of the plurality of blocks including a linking root of the first data structure. Creating the alternating structure further includes creating a first timestamp attestation over the first block. The method further includes determining an order of the plurality of blocks corresponding with at least one chain, determining a set of blocks of the plurality of blocks and replicating.

20 Claims, 7 Drawing Sheets

Related U.S. Application Data

(60) Provisional application No. 63/286,382, filed on Dec. 6, 2021.

(56) References Cited

U.S. PATENT DOCUMENTS

| | | | |
|---|---|---|---|
| 2020/0382315 A1 | 12/2020 | Lakk | |
| 2021/0049717 A1 | 2/2021 | Li | |
| 2021/0232707 A1 | 7/2021 | Wilson et al. | |
| 2022/0321358 A1 | 10/2022 | Jackson et al. | |

OTHER PUBLICATIONS

Foreign Action other than Search Report (IPRP) on PCT/US2022/051753 dated Jun. 20, 2024. 7 pgs.

Harer, "Decentralized Attestation of Conceptual Models Using the Ethereum Blockchain", 1-11, 21st IEEE Conference on Business Informatics (CBI 2019), Jul. 15, 2019; Entire Document; DOI: 10.1109/CBI.2019.00019.

PCT International Search Report and Written Opinion for International Pat. Appl. No. PCT/US2022/051753.

Xiao, "A Survey of Distributed Consensus Protocols for Blockchain Networks", 1-34, IEEE Communications Surveys and Tutorials, Jan. 29, 2020, Entire Document; DOI: arXiv:1904.04098 [cs.CR].

Yazdinejad, "P4-to-Blockchain: A secure Blockchain-enabled Packet Parser for Software Defined Networking" pp. 1-27, Computers and Security, vol. 88, Issue C, Sep. 29, 2019; Entire Document; DOI: 10.1016/j.cose.2019.101629.

| Symbol | Meaning | Format/Type |
|---|---|---|
| $a$ | Enclave attestation | $\langle r, K, g, \ldots\rangle$ |
| $A$ | A set of enclave attestations | $\{a_0, a_1, \ldots\}$ |
| $\mathcal{A}$ | Enclave Service | AWS Nitro Enclave |
| $b$ | Block | $\langle u, m^H, t^H\rangle$ |
| $B$ | A set of blocks | $\{b_0, b_1, \ldots\}$ |
| $c$ | Batch number | `uint` |
| $d$ | Transaction data | `byte[]` |
| $f$ | Certificate | $\langle b_0, K^+_{\mathcal{S}}, d^H, \bar{t}, \underline{t}\rangle$ |
| $g$ | Signature | `byte[]` |
| $H$ | Cryptographic hash function | `SHA3` |
| $i$ | Block height | `uint` |
| $k$ | Counter value | `uint` |
| $K^+/K^-$ | Public/private key | `byte[]/byte[]` |
| $m$ | Merkle tree | `byte[]` |
| $M$ | A set of Merkle trees | $\{m_0, m_1, \ldots\}$ |
| $p$ | Physical clock reading | `uint` |
| $r$ | User data in $a$ | `byte[]` |
| $s$ | Sequence attestation | $\langle y, k, g\rangle$; $y = u +\!\!+ H(t)$ |
| $\mathcal{S}$ | Sequencer Service | Sequencer on $\mathcal{A}$ |
| $t$ | Timestamp attestation | $\langle y, p, g\rangle$; $y = H(b)$ |
| $T$ | A set of timestamp attestations | $\{t_0, t_1, \ldots\}$ |
| $\mathcal{T}$ | Timestamp Service | AWS Cognito |
| $u$ | Unique block ID | `byte[]` |
| $y$ | Byte array | `byte[]` |
| $\{y\}_K$ | Encryption of $y$ with $K$ | `byte[]` |
| $D_K(y)$ | Decryption of $y$ with $K$ | `byte[]` |

FIG. 1

Algorithm $omc(b_0, K_S^+, K_T^+, B, T, A)$

```
Z ← [ ]    ▷ Main chain blocks and timestamp attestations
k ← −1    ▷ Sequence number of the last block in Z
▷ Check block b_0 ◁
if ∃b ∈ B, t ∈ T, a ∈ A | H(b) = H(b_0) ∧
   t.y = H(b) ∧ validate(K_T^+, t) ∧ a.r.k = 0 ∧
   a.r.y = b.u++H(t) ∧ check(K_S^+, a) then
    Z ← Z ++ b ++ t    ▷ Add b_0, t_0 to the main chain
    k ← 0    ▷ Record seq. num. of b_0
else
    return ∅    ▷ Block b_0 was invalid
▷ Add main chain blocks and attestations to Z ◁
loop
    ▷ Find all immediate successors to last block in Z ◁
    C ← {(b, t, a) |b ∈ B ∧ t ∈ T ∧ a ∈ A ∧
                    b.t^H = H(Z.tail) ∧
                    t.y = H(b) ∧ validate(K_T^+, t) ∧
                    a.r.y = b.u++H(t) ∧ check(K_S^+, a)}
    if |C| = 0 then
        return Z    ▷ No more successors
    ▷ Find successor with minimal sequence attestation ◁
    z ← argmin_{c∈C} c.a.r.k
    ▷ Fill in the sequence gap ◁
    G ← {(b, t, a) |b ∈ B ∧ t ∈ T ∧ a ∈ A ∧
                    t.y = H(b) ∧ validate(K_T^+, t) ∧
                    a.r.y = b.u++H(t) ∧ check(K_S^+, a) ∧
                    a.r.k ∈ [k, z.a.r.k]}

    if |G| ≠ z.a.r.k − k − 1 then
        ▷ Missing a sequence attestation ◁
        return Z
    ▷ Extend the main chain ◁
    Z ← Z ++ z.b ++ z.t
    k ← z.r.k
```

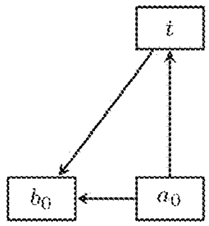

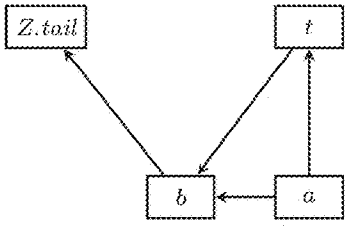

FIG. 6

Algorithm $makeCertificate(b_0, K_S^+, H(d), M, Z)$

▷ Find the first block, after $b_0$ with a Merkle tree containing transaction $d$ ◁ for $x \leftarrow 2, x < |Z|-1, x \leftarrow x + 2$ do if $\exists m \in M \mid H(d) \in m \wedge Z[x].m^H = H(m)$ then

▷ Found $d$ in a block. Return a certificate. ◁ return $\langle b_0, K_S^+, H(d), Z[x-1], Z[x+1] \rangle$ return $\varnothing$ ▷ No main chain block contains $d$

FIG. 7

SYSTEM AND METHOD FOR CREATING AND MAINTAINING IMMUTABILITY, AGREEMENT AND AVAILABILITY OF DATA

CROSS-REFERENCE TO RELATED PATENT APPLICATIONS

This application is a continuation of U.S. patent application Ser. No. 18/072,574 (now U.S. Pat. No. 12,160,532), filed on Nov. 30, 2022, which claims priority to U.S. Provisional Application No. 63/286,382, filed Dec. 6, 2021, each of which are incorporated herein by reference in their entireties and for all purposes.

STATEMENT REGARDING FEDERALLY SPONSORED RESEARCH OR DEVELOPMENT

This invention was made with government support Contract No.: 2025375 to Blocky, Inc., awarded by the National Science Foundation. The government has certain rights in the invention.

BACKGROUND

1. Field of the Invention

The present invention relates generally to the field of distributed ledger technologies, or blockchains, and, more particularly, to a system and method for creating and maintaining immutability, agreement and availability of data.

2. Description of Related Art

Distributed ledger technologies (DLTs), or blockchains, make possible a growing number of decentralized alternatives to traditionally centralized financial, governmental, and legal services. Proof of work blockchains made the development of decentralized services only marginally practical due to high delay, low throughput, and high and unpredictable cost of recording and executing transactions. Newer blockchain proposals address these limitations with novel consensus mechanisms, faster block distribution techniques, and less speculative transaction pricing [1]-[3]. Fundamentally, however, the performance of blockchains is limited by their reliance on distributed consensus [4], seemingly central to distributed ledger correctness guarantees.

Blockchains are a mechanism that guarantees immutability, agreement, and availability of data. Blockchains provide immutability by cryptographically linking blocks in a way that makes their retroactive modification without renewed distributed agreement near-impossible. Agreement comes from a blockchain's distributed consensus protocol, which ensures that the creation of new blocks follows preset rules. Finally, availability comes from the application of blockchain state among distributed nodes that prevents its deletion and, in the case of public blockchains, provides censorship resistance.

In other words, blockchains achieve their correctness guarantees by relying on distributed algorithms that operate among a number of notes separated by a network. When distributed algorithms need to maintain consistent state, but the network is slow, the result is momentary interruptions of system availability [5], perceived by users as degraded throughput. Though blockchain mechanisms vary, the tradeoff between system consistency and availability results in network performance placing a limit on blockchain throughput.

The present invention proposes to improve performance by revisiting the underlying trust relationships between a blockchain and its users. Blockchains are considered trustless peer-to-peer systems because to use them, users do not need to trust each other; other widely used systems are based on strong, but limited, trust relationships. For example, users generally trust certificate authorities' assertions of public keys. Similarly, authentication services based on OAuth 2.0 [6] are generally trusted to issue correct authentication tokens. Such trust relationships emerge from a clear self-interest in the correctness of the service by its provider.

The present invention demonstrates that limited trust in third-party services can give rise to a novel system to create immutability, agreement, and availability through a mechanism that transfers users' trust in these third-party services into trust of blockchain correctness guarantees. Specifically, the present invention incorporates: (a) the design and implementation of a blockchain construction method that transfers the trust in such services into trust in blockchain correctness guarantees.

BRIEF SUMMARY OF THE INVENTION

The present invention is a method for creating and maintain immutability, agreement and availability of data comprising the steps of: building an alternating structure of blocks and timestamp attestations by: constructing a first Merkle tree having leaves of transaction data; creating a first block that contains a root of the first Merkle tree; using a trusted timestamp service to create a timestamp attestation over the first block; constructing a second Merkle tree having leaves of transaction data; creating a second block that contains a root of the second Merkle tree; linking the second block to the timestamp attestation of the first block; using a trusted timestamp service to create a timestamp attestation over the second block; and repeating the foregoing steps over a series of blocks and timestamp attestations to create the alternating structure in which each block is linked to the timestamp attestation of an immediately preceding block; determining an order of blocks by: using a trusted sequencer service to assign a sequence attestation over each block and its timestamp attestation, wherein each sequence attestation has a unique number; and wherein each block has a height, creating a total order of the blocks based on the height of each block and the sequence attestation assigned to each block; determining which of the blocks are on a main chain by: checking validity of the timestamp attestation over the first block; checking validity of the sequence attestation over the first block and of the timestamp attestation over the first block; adding the first block and the timestamp attestation over the first block to the main chain; wherein the main chain has a last block, wherein the last block has a sequence attestation, extending the main chain from the last block by: finding all successor blocks of the last block, wherein each successor block has a timestamp attestation and a sequence attestation; identifying a successor block with a sequence attestation that is lower than the sequence attestations of all other successor blocks; checking validity of the timestamp attestation and validity of the sequence attestation of the successor block identified in step (c) (iv) (2); and if all blocks with sequence attestations between the sequence attestation of the last block on the main chain and the sequence attestation of the successor block with the lowest sequence attestation can be found, adding to the main chain the successor block with the lowest sequence attestation and the timestamp attestation over the successor block with the lowest sequence attestation; and repeating the foregoing steps over a set of blocks, timestamp attestations, and sequence attestations; and using a trusted replication service to replicate all of the blocks, all of the timestamp attestations, all of the sequence attestations, and all of the leaves of the Merkle trees.

The present invention is also a computer program product comprising a storage device storing instructions in a non-transitory manner, which instructions, when executed by a processing unit of a computing device, cause the computing device to: create and maintain immutability, agreement and availability of data using the method described above. In addition, the present invention is a computing device comprising a processing unit, memory or other storage device coupled to the processing unit, the memory or other storage device storage instructions, which, when executed by the processing unit, cause the computing device to: create and maintain immutability, agreement and availability of data using the method described above.

BRIEF DESCRIPTION OF THE DRAWINGS

FIG. 1 is a table of definitions of notations used herein.

FIG. 6 is a flow diagram of the omc function of the present invention.

FIG. 7 is a flow diagram of the makeCertificate function of the present invention.

DETAILED DESCRIPTION

A. Trusted Services

Figure 2:
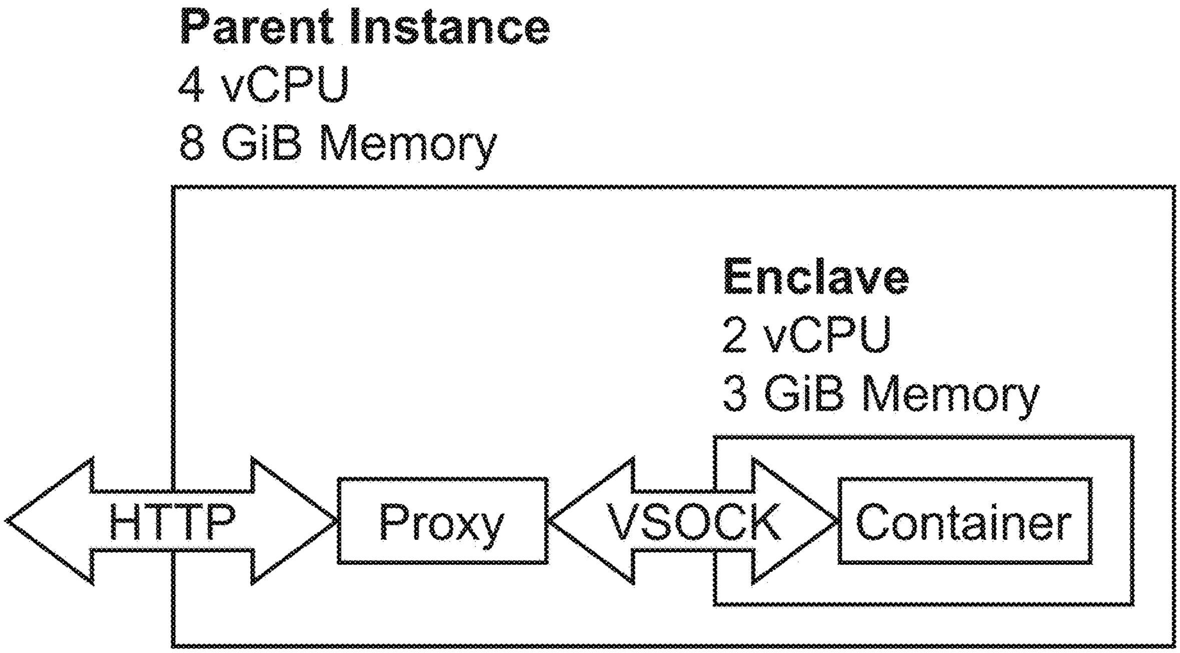
FIG. 2 is a diagram of a parent instance of AWS Nitro Enclaves.

The present invention makes a departure from distributed blockchain implementations to provide its guarantees of immutability, agreement, and availability based on trusted services. This section describes the abstractions and implementations of trusted timestamp, trusted sequencer, and trusted replication services within the context of the present invention.

1. Trusted Timestamp

The function of the trusted Timestamp Service is to provide accurate and trustworthy physical clock timestamps. A Timestamp Service T maintains a public/private key pair $$K_T^+/K_T^-$$

and an accurate physical clock. A Timestamp Service provide the following abstract interface:

$$t = \text{timestamp}(y)$$

$$\text{true/false} = \text{validate}(K, t)$$

The timestamp function takes bytes y as input, reads the physical clock value p, and use these to create a timestamp attestation t. The attestation is a tuple t=(y,p,g), with signature $$g = \{H(y, p)\}_{K_T^-},$$

where H a cryptographic hah function. The validate function takes a key K and a timestamp attestation t as input to determine that y and p are correctly signed, or that H(t.y, t.p)=$D_K$(t.g), where D is a decryption function. Note that the "." operator is used for member selection. When users trust a Timestamp Service and $$\text{validate}(K_T^+, t)$$

returns true, they can trust that the Timestamp Service T has witnessed bytes t.y at time t.p. Note that while the timestamp function must execute on the trusted Timestamp Service, the validate function may be executed by a user as long as $$K_T^+$$

is well-known.

The present invention implements the Timestamp Service based on the user authentication service Amazon Cognito™ (auth service). The auth service accepts user credentials (username and password) and when valid, produces a JSON Web Token (JWT). The JWT contains the username, timestamp, and other fields, signed by the auth service.

To produce a JWT such that it is a timestamp attestation for bytes y, the present invention performs two steps. First, it creates, on the auth service, a user with:

$$\text{username} = y@bky.sh$$

and a random password. Second, it uses the username and password to authenticate with the auth service to produce a JWT. As the JWT contains: y in the username; the auth service's timestamp; and both pieces of data are signed by the auth service, the resulting JWT is sufficient for a timestamp attestation; therefore, a user that trust Amazon Cognito can trust that bytes y were seen by Amazon Web Services™ (AWS) at a specific time.

2. Trusted Sequencer

The function of the trusted Sequencer Service is to provide consecutive number to distinct events. A Sequencer Service S maintains a public/private key pair $$K_S^+/K_S^-$$

and a counter. A Sequencer Service provides the following abstract interface:

$$s = \text{sequence}(y)$$

$$\text{true/false} = \text{check}(K, s)$$

The sequence function takes as input bytes y representing a unique event ID, increments the counter by one, records the counter value as k, and produces a sequence attestation s=⟨y,k,g⟩, where $$g = \{H(y, k)\}_{K_S^-}.$$

Note that some symbols, such as k, are reused when their meaning can be differentiated by member selection. For example, the physical timestamp t.k can be differentiated from the sequence number s.k because the k's in question are members of different types. The check function takes a key K and a sequence attestation s as input to determine that y and k are correctly signed, or that H(s.y,s.k)=$D_K$(s.g). When users trust a Sequence Service and $$\text{check}(K_S^+, g)$$

returns true, they can trust that a unique event represented by s.y was witnessed by the Sequence Service S as the s, kth event. Similarly to timestamp, the check function may be executed by a user as long as $$K_S^+$$

is well-known.

The Sequence Service is based on the security and correctness guarantees provided by the AWS Nitro Enclaves™ trusted execution environment (TEE). AWS Nitro Enclaves creates an isolated execution environment inside an Amazon EC2™ (Elastic Cloud Compute) instance based on the same Nitro Hypervisor technology that provides isolation between Amazon EC2 instances themselves. Inside an Amazon EC2 parent enclave, as shown in FIG. 2, an enclave runs a container on its own kernel, memory, and virtual CPU (vCPU) resources sequestered from the parent instance. An enclave has no persistent storage, interactive access, or external networking. The only means for the parent instance to interact with an enclave is through a VSOCK socket. The parent instance, however, may proxy external requests for example by running a Hypertext Transfer Protocol (HTTP) server. Finally, applications running inside the enclave may request attestations from the Nitro Secure Module (NSM). An attestation includes information about the enclave environment recorded as hashes of the continuous measurements of the parent instance ID, the enclave image file (container), and the application requesting the attestation. Optionally, the attestation may also include the public key of the enclave and up to 1024 B of user date [7]. NSM packages the attestation as a Concise Binary Object Representation (CBOR)-encoded, CBOR Object Signing and Encryption (COSE)-signed object by the AWS Nitro Enclaves Attestation key pair $$K_A^+/K_A^-, \text{ where } K_A^+$$

is in a well-known root certificate.

The implementation of the trusted Sequencer Service on an AWS Nitro Enclaves is as follows. Since AWS Nitro Enclaves produce their own attestations, the Sequencer Service interface is modified to:

$$a = \text{sequence}(y)$$

$$\text{true/false} = \text{check}(K, a)$$

in which an enclave attestation a includes a sequence attestation s and the signed hash of the image file running on the enclave. To provide a trusted Sequencer Service, the parent instance runs a gateway that proxies calls to the sequence function running on enclave S. A sequence request includes bytes y representing a unique event ID and serves as an idempotency key inside S.

Upon receiving a sequence request the enclave increments an in-memory counter and produces a sequence attestation s=⟨y,k,g⟩ as defined above. It is important to note that repeated requests to sequence the same y will not increment the counter and produce a new sequence attestation; instead, the Sequencer Service will serve a cached ⟨y,k,g⟩. The enclave then requests an enclave attestation a from the NSM, where public key $$a.K = K_S^+$$

and user data a.r=s. Finally, the enclave returns a to the parent instance, which forwards it to the client.

Upon receiving the enclave attestation a, a client can verify it by calling the check function locally. The check function first verifies that the signature of a against Amazon's certificate of $$K_A^+.$$

Next, check verifies the sequence attestation against the enclave's public key by testing the H(a.r.y,a.r.k)=$D_{aK}$(a.r.g). If both verifications pass $$\text{check}(K_S^+, a)$$

returns true, at which point the client can trust that even a.r.y was assigned the sequence number a.r.k by a Sequence Service S.

It is important to note that in the Sequencer Service implementation the enclave generates the key pair $$K_S^+/K_S^-$$

on startup, which is distinct across all enclave instantiations. Consequently, every sequence attestation produced by an enclave is unique since the enclave uses a distinct $$K_S^-$$

to sign an incremental k. As a result, it is not possible, even if a Sequencer Service is restarted, to produce two sequence attestations with the same k for different y signed by $K_S^-$.

The last issue is that of user trust. A user may trust that the AWS Nitro Enclaves system works correctly, but the Sequencer Service is based on a specific implementation. The implementation's code and build tools are publicly available and so a user may perform an audit of the code, build an image, and take the hash of the image H(I). Recall that the enclave attestation contains a signed hash of the image running on the enclave H(I'); therefore, when a user trusts an implementation of the Sequencer Service, they can verify that a sequence attestation was produced from the trusted implementation by checking H(I)=H(I'). In other words, the hash of the image that they built matches the hash of the image in the enclave attestation.

3. Trusted Replication

The function of the trusted Replication Service is to provide stable storage to data objects. Since storage nodes have non-zero mean time between failures (MTBF), storage stability is probabilistic and comes from replication of data objects among nodes with mostly independent failures. A Replication Service provides the following abstract interface:

$$\text{replicate}(y)$$

$$y = \text{fetch}(H(y))$$

The replicate function takes as input object bytes y and replicates them across storage nodes under H(y) as the retrieval key. The fetch function takes the hash of the object bytes H(y) as input and returns the object bytes y from one or more replicas.

Fundamental models of distributed systems commonly assume that nodes have access to stable storage to imply that protocol data services node failures. To argue the correctness of the present invention, the notion of stability needs to be strengthened and made more specific. In this context, a stable storage service is defined as providing durability, immutability, and verifiability. Durability means that a stored object will remain eventually accessible. Immutability means that a stored object will not change in storage. Verifiability means that a third-party may verify that a storage service provides durability and immutability.

The Replication Service is implemented based on the correctness guarantees of Write Once, Read Many (WORM) cloud storage systems. WORM systems enable their clients to protect stored data against inadvertent modification, or deletion, to meet regulatory requirements on data retention [8]. Specifically, the Amazon S3™ (Simple Storage Service), Microsoft Azure Blob Storage™, and Google Cloud Storage™ guarantee object immutability through legal/compliance holds on data objects that prevent anyone, including the bucket owner, from deleting or modifying objects [9]-[11]. The durability of storage systems are often measured as follows. For k>1 and time duration d, k-nines per d means that the vendor promises to not loose $(100-10^{(1-k)})$ percent of a user's data over duration d. For example, Amazon, Microsoft and Google provide system with 11 nines per year of durability by replicating data across availability zones within a region [7], [12], [13]. Finally, cloud storage providers allow, with some custom configuration, to make bucket settings publicly readable, which allows anyone to verify that object holds are enabled. Alternatively, an AWS Nitro Enclaves with read-only credentials may inspect bucket settings and emit publicly verifiable attestations over bucket.

Although the 11-nines per year durability guarantee is the industry standard, it is not sufficient by itself for storage of the present invention's objects. To achieve sufficient durability, the present invention uses the following storage scheme. First, the system uses random linear network coding to encode each object into 6 shares such that any 3 shards can decode the object. Second, the shards are partitioned into six buckets (two buckets per provider) such that all bucks are in distinct regions. Partitioning allows for failures to be considered independent. Following the Backblaze™ method for computing durability [15], the storage scheme achieves 14-nines of durability over 100 years [16].

4. Reliability

In addition to being trusted, the design of the present invention also requires the Timestamp Service, Sequencer Service, and Replication Service to be reliable in that they can recover from crash failures. While reliability at the cost of temporary unavailability may be assumed for Amazon Cognito and cloud storage services, the same cannot be done for AWS Nitro Enclaves. An enclave may crash, but because it relies on an internally generated key pair and in-memory state to provide unique sequence attestations, the enclave may not be restarted. For the remainder of this document, it is assumed that the Sequencer Service is reliable, at the cost of no new blocks being possible in the case of a Sequencer Service failure.

B. Detailed Description of the Invention

The present invention generates a new blockchain that provides immutability, agreement, and availability based on strong, but limited, user trust in the Timestamp, Sequence, and Replication services. The key innovation of the present invention is the structure and construction process of its chains that transfer user trust in these services into trust in the present invention's correctness guarantees.

Figure 3:
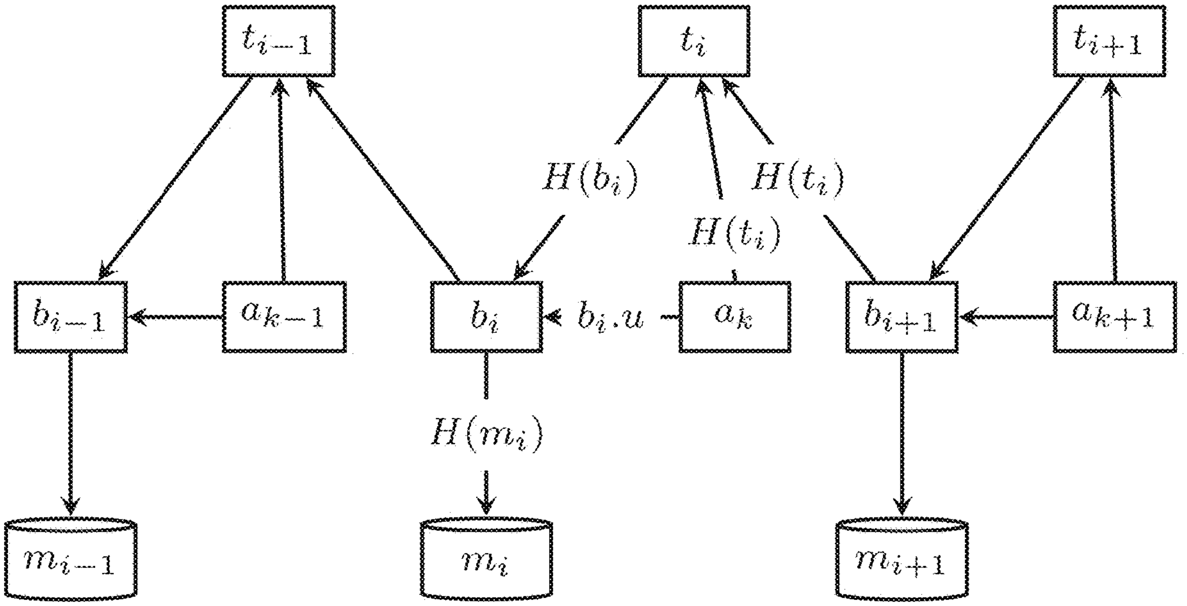
FIG. 3 is a diagram of a blockchain formed by the present invention.

FIG. 3 depicts the present invention's data representation. Let m bed a Merkle tree. Note that H(m) is overloaded to mean the root of the tree (not the has of the entire team). A block includes the root of a Merkle tree created from a set of leaves containing transaction data. For a block b, the height of b is the number of blocks on the path from b to $b_0$. For convenience, a block b at height i can be referred to as $b_i$ and its height denoted as b.i. The block $b_i$ includes the root of the Merkle true $m_i$ as $b_i$, $m^H=H(m_i)$. The blocks also include a Universally Unique Identifier (UUID) field u assigned during block creation.

The physical timestamp for each block comes from a timestamp attestation created by the trusted Timestamp Service. For example, the timestamp attestation $t_i$ includes the hash of the block $b_i$ as $t_i.y=H(b_i)$. To link each timestamp attestation to the next block, the next block $b_i+1$ includes the hash of $t_i$ as $b_{i+1}.t^H=H(t_i)$.

The sequence number for each block comes from its sequence attestation created by the trusted Sequencer Service. For example, the kth sequence attestation $s_k$ (inside of $a_k$) includes the unique id of the block $b_i$. To make dealing with forks easier during the verification process, $s_k$ attests both the block and its timestamp attestations as $s_k.y=b_i.u$++ $H(t_i)$. Note the "++" operator is used for concatenation.

It is possible for multiple chains to coexist. The present invention's chains be differentiated by the block zero $b_0$ and $b'_0$ (made unique by the UUIDs) associated with a specific Sequencer Service instances identified by their unique public keys $K_S^+$ and $K_{S'}^+$ generated during the startup of S and S', respectively. Just as user can trust the correctness guarantees of one chain, so can multiple chains trust each other's correctness guarantees; however, the total order of transactions is maintained within a chain, but not across chains.

The structure of the present invention guarantees immutability, agreement, and availability. Each of these guarantees is described more fully below, following which is a discussion of an implementation of the present invention.

1. Immutability

The present invention guarantees immutability by the alternating structure of blocks and timestamp attestations that come together like teeth of zipper. A timestamp attestation provides a third-party trusted signature over the hash of the block, which includes the Merkle root constructed from a set of transaction data, also referred to as transactions. Any change to these transactions would be detectable as a mismatch between the block hash and the bytes signed by the timestamp attestation. Thus, as long as a timestamp attestation remains a part of a chain, its block remains immutable.

A timestamp attestation remains in the chain because the following block includes its hash. Thus, an attestation at the at end of a chain signs its block and, transitively, the previous attestation and, indirectly, its block, and so on.

A user that considers a block as belonging to an instance of the described blockchain can be sure of the block's integrity by verifying its timestamp attestation. The user can also check the integrity of the chain by verifying the preceding blocks and attestations all the way to a well-known block zero for a particular chain instance.

2. Agreement

Figure 4:
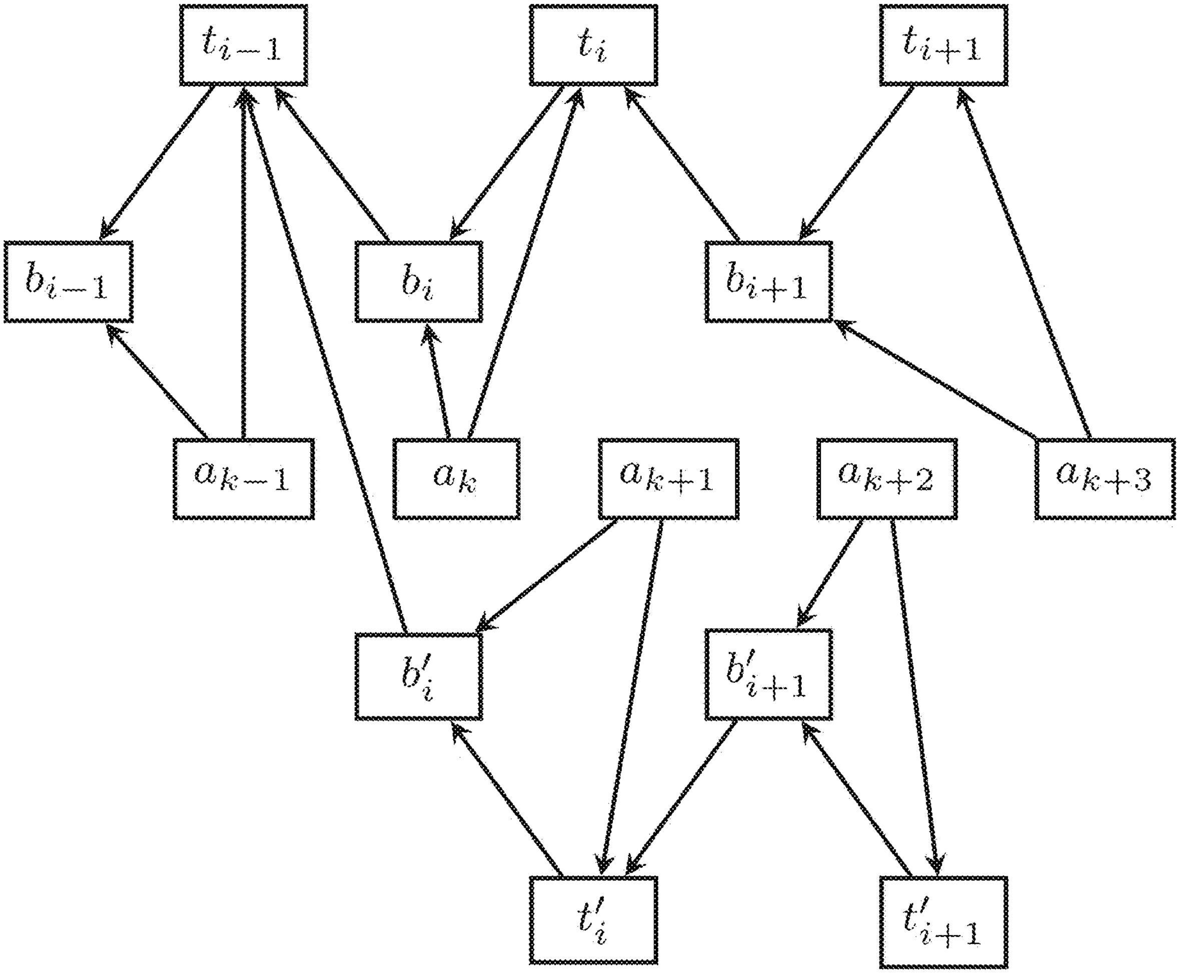
FIG. 4 is a diagram of a fork in a blockchain formed by the present invention.

The present invention guarantees agreement by detecting and eliminating chain forks so that all users see the same totally ordered set of blocks and, by extension, transactions. A fork is defined as the existence of two blocks $b_i$ and $b'_i$ with the same block height i>0 and the same previous block $b_{i-1}$. FIG. 4 illustrates a fork in a chain produced by the present invention, where blocks $b_i$ and $b'_i$ point to the same previous timestamp attestation $t_{i-1}$ and transitively block $b_{i-1}$.

Forks are problematic in blockchains because they create the possibility of an inconsistency of application state represented on the blockchain. For example, assume two users submit transaction data d and d' that are incompatible with each other. If there is no fork in the chain, any client reading the blockchain sees the same consistent history in which, say, d precedes d' in the same block, or across different blocks. Then, according to the rules of an application, the transaction d may be applied to the state and d' may be ignored. If, on the other hand, d and d' to determine which transaction to apply and which to ignore.

Forks also create another problem unique to the present invention. A user verifying the integrity of an instance of the described blockchain by walking through it backwards from a given block, may not know whether the encountered blocks are on the main chain, or on a fork. This uncertainty is problematic because transactions in blocks on a fork will not be considered valid by the users following the main chain. Additionally, the forked blocks may be maliciously deleted without users on the main chain detecting that deletion.

The present invention detects forks by using block heights and sequence attestations to create a total order of all blocks (those on the main chain and on all forks). Given two tuples ⟨b,t,a'⟩ and ⟨b',t',a'⟩ of corresponding blocks, timestamp, and enclave attestations (containing sequence attestations) such that a.r.y=b.u++H(t) and a'.r.y=b'.u++H(t'), an order relation (→) is defined as follows:

$$(b, a) \to (b', a') \Leftrightarrow b.i < b'.i \vee (b.i = b'.i \wedge a.r.k < a'.r.k).$$

For example, the total order of the pairs of blocks and enclave attestations in FIG. 4 is $(b_{i-1},a_{k-1})\rightarrow(b_i, @k)\rightarrow(b'_i, a_{k+1})\rightarrow(b'_{i+1},a_{k+2})\rightarrow(b_{i+1},a_{k+3})$. When there is a fork, the user determines which block is on the main chain using two rules. First, a block may be on the main chain only if its parent is on the main chain. Second, if multiple blocks have a parent on the main chain, the lowest order block is on the main chain. For example, following FIG. 4, assume that $b_{i-1}$ is on the main chain and the fork starts at block height i. Given, $(b_i,a_k)$ and $(b'_i,a_{k+1})$ at the start of the fork, the user determines which block is on the main chain by observing that $(b_i,a_k)\rightarrow(b'_i,a_k+1)$, which implies (deterministically) that $b_i$ is on the main chain, while $b'_i$ is not. Similarly, given that $b_i$ is on the main chain, users can deterministically decide $b_{i+1}$ is on the main chain even though $(b'_{i+1},a_{k+2})\rightarrow(b_{i+1},a_{k+3})$ because $b_{i+1}$'s predecessor is on the main chain, while the predecessor $b'_{i+1}$ is not.

3. Availability

The present invention provides strong, probabilistic guarantees on the availability of data by using a trusted Replication Service to increase the distribution of blocks, timestamp attestations, sequencer attestations, and the leaves of the Merkle trees. Data replication with a trusted Replication Service creates redundant shards of data distributed among independently failing replicas. As a consequence, the encoded data remains available to users even if some of the replicas become unavailable. Even in the case where a sufficient number of replicas is not momentarily available, users remain confident that the stored data remains intact, because of the high durability guarantees of a trusted Replication Service, and will become available again. It is important to note that the present invention records transaction data in a manner that allows users to verify immutability and agreement over blockchain transactions as long as the guarantees of a trusted Replication Service remain in place, even if the other trusted services, or the blockchain creation mechanism, become unavailable.

4. Implementation

The present invention provides the following abstract interface:

$$\text{write}(d)$$

$$f = \text{verify}(b_0, K_S^+, K_T^+, H(d))$$

The write function takes the transaction data d as input and starts the process of recording d on an instance of the described blockchain invention. The verify function takes the chain with genesis block $b_0$, the public key of the Sequence Service $K_S^+$, the public key of the Timestamp Service $$K_T^+,$$

and the hash of a transaction H(d) as input to return a certificate f, which confirms that the transaction exists in a finalized block on a chain with genesis block $b_0$. The certificate contains the transaction hash $d^H$, two timestamps $\bar{t}$ and $\underline{t}$ representing the upper and lower time bounds for transaction acceptance, and the chain fields $b_0$. When users trust the verify function they know that the transaction d was written onto a chain between $\dot{t}$ and $\underline{t}$ and will remain unchanged on that chain.

a. Recording a Transaction

Figure 5:
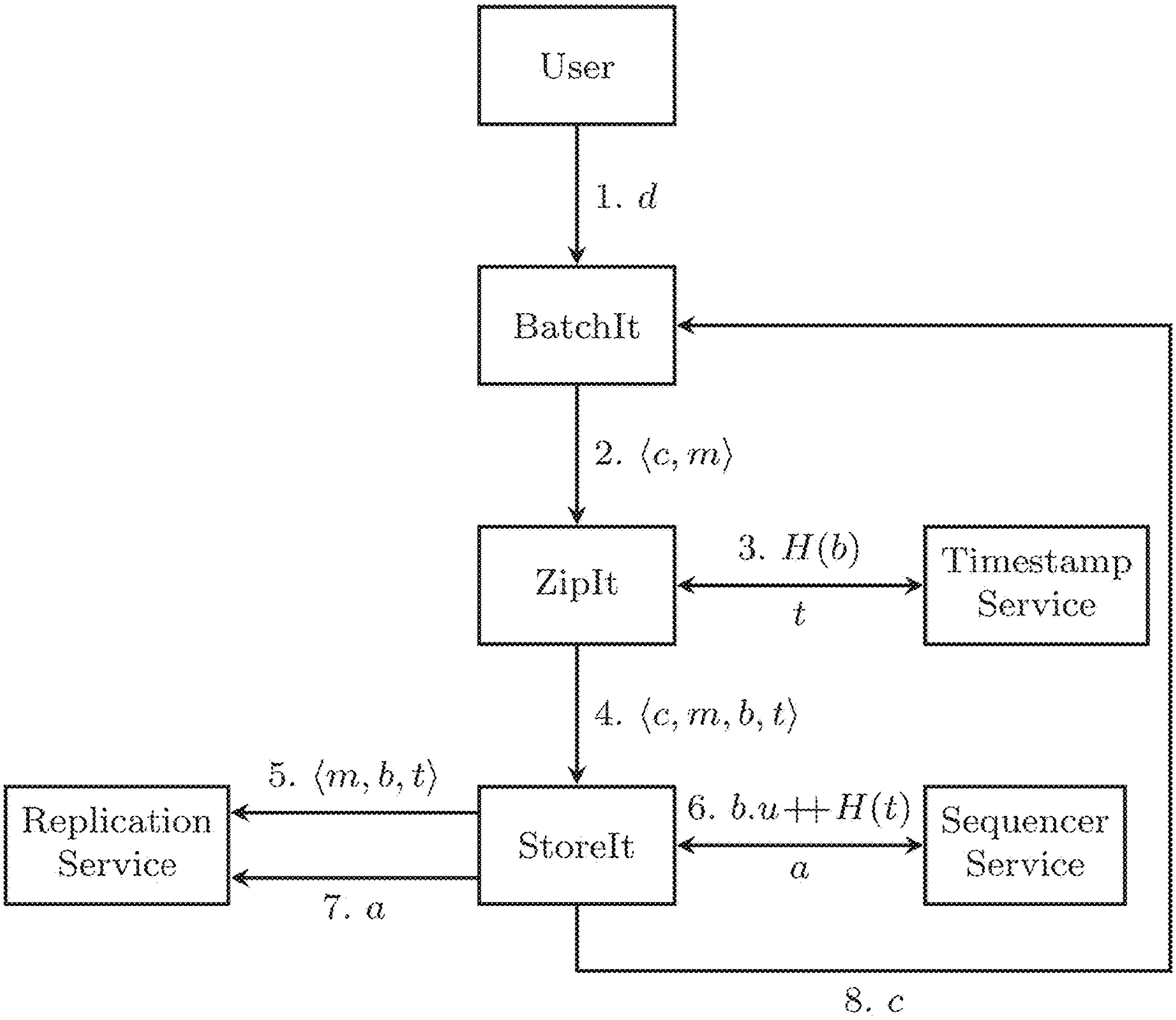
FIG. 5 is a flow diagram of the write function of the present invention.

FIG. 5 shows the process implementing the write function in the present invention. The numbering of the process description below corresponds to the arrow numbering in the figure.

1. To sign a transaction d, a user calls write (d). The BatchIt service receives d and enqueues the write request internally.
2. Periodically, the ZipIt service askes BatchIt for a batch of write requests. BatchIt dequeues a set of requests and creates a batch identified by a batch ID c. BatchIt then creates a Merkle tree m, where each leaf is transaction data d from a write request in the batch. BatchIt then replies to ZipIt with the tuple (c,m).
3. Upon receiving a batch from BatchIt, the ZipIt service creates a block $b=\langle u,m^H,t^H\rangle$, where u is a freshly generated UUID, $m^H=H(m)$ is the root of the Merkle tree, and $t^H=H(t_{i-1})$ is the hash of the preceding timestamp attestation. The starting point of the blockchain is a well-known block zero $b_0$ and its corresponding timestamp attestation $t_0$, and so ZipIt always has $t_{i-1}$ to include in a block. Next, ZipIt invokes the timestamp function of a trusted Timestamp Service by passing it the hash of the block H(b). The attestation service returns a timestamp attestation $t_i=\langle y,p,g\rangle$, where y=H (b) and $g=\{H(y,p)\}_{KT}$. Finally, ZipIt saves t internally as $t_{i-1}$ to include its hash in the next block.
4. ZipIt sends the tuple (c,m,b,t) to the StoreIt service.
5. StoreIt sends the tuple (m,b,t) for replication to the Replication Service. StoreIt does not move onto the next step until the Replication Service confirms that the tuple has been successfully replicated.
6. Once a block has been replicated it is safe to assign it a sequence number. StoreIt send the unique ID of the block b.u concatenated with the hash of the timestamp t attestation H(t) to the Sequencer Service, which replies with an enclave attestation a containing the sequence attestation $$s = \langle b.u + +H(t), k, g\rangle, \text{ where } = \{H(b.u + +H(t), k)\}_{K_S^-}.$$

7. The StoreIt service passes the enclave attestation a to the Replication Service for replication. Upon completing the replication of the enclave attestation, all transactions in the block are finalized.
8. Finally, StoreIT sends the batch id c to BatchIt to notify it that a block corresponding to a batch of requests has been replicated, which allows BatchIt to delete the batch.

It is important to note that the write function does not guarantee that a transaction has been recorded on the blockchain. The write function returns after step 1 notifying the user that the transaction has been accepted for processing. The user knows that a transaction has been recorded on the blockchain only after the verify function returns a certificate. The user can expect that verify will produce the correct result on a transaction only after the transaction is finalized.

b. Verifying a Transaction

After calling the write function on a transaction, the user needs to verify that the transaction was written onto the blockchain, i.e., that the transaction exists in a finalized block on the main chain. The verification process proceeds as follows:

1. To verify a transaction, a user calls $$\text{verify}(b_0, K_S^+, K_T^+, H(d))$$

by passing in transaction data d and the information identifying the blockchain, namely, a block zero $b_0$, along with the and the public key of a Sequencer Service $$K_S^+$$

and the public key $$K_T^+$$

of the Timestamp Service. As mentioned earlier, the verify function can execute on the user's machine; for this reason, the user does not need to trust the organization running the present invention to execute the function correctly.

2. The verify function downloads the current state of the blockchain from the Replication Service. Specifically, this state comprises the set of blocks (B), Merkle trees (M), timestamp attestations (T), and enclave attestations (A). In practice, these sets and their verification as described below may be cached (bootstrapped) and extended as the chain grows.
3. Next, the verify function determines which blocks and timestamp attestations are on the main chain. To do so, verify calls the function omc, shown in FIG. 6, which produces a set of alternating main chain blocks and timestamp attestations $$Z = omc(b_0,\ K_S^+,\ K_T^+,\ B,\ T,\ A).$$

4. Finally, the verify function determines whether any main chain block contains the transaction data d. It is assumed that transactions are idempotent and their hashes unique; therefore, the certificate of a transaction always pertains to its first instance. To create a certificate, verify calls the makeCertificate function, shown in FIG. 7, which produces a certificate $$f = makeCertificate(b_0, K_S^+, H(d), M, Z).$$

If f≠Ø, verify returns the certificate to the user.

When the verify function returns a certificate f, the function asserts that the transaction data d existed before f.$\bar{t}$ and after time f.$\underline{t}$ on the chain with genesis block $b_0$. When verify returns a certificate it also indicates that the transaction is final and will not change on the blockchain.

Let f and f' be certificates over transaction data d and d', respectively, such that b is the block with hash f.$\underline{t}$.$b^H$ and b' is the block with hash f'.$\underline{t}$.$b^H$. Data d proceeds d' if and only if b.i<b'.i, or b.i=b'.i and d is to the left of d' in the leaves of the Merkle tree m, such that H(m)=b.$m^H$.

5. Advantages Over Prior Art

Early blockchain designs, such as Bitcoin [18], were made possible by a Proof-of-Work (PoW) and the Nakamoto probabilistic consensus. A miner creates a new block by solving a cryptographic puzzle and guess a nonce, the hash of which, together with other parts of the blockchain, produces a hash that is sufficiently small when considered as a binary number. While this mechanism has proven resilient to coordinated attacks, it is costly in terms of electricity used by mining hardware. To address the cost of mining of new blocks, Peercoin™ [19] was the first to adopt Proof-of-Stake (POS), where the opportunity to create the next block is decided by a lottery weighted by the number of coins staked by a verifier node rather than the node's hash power. Often, correctness is enforced by a Byzantine Fault Tolerant (BFT) consensus mechanism. Both PoW and PoS designs have led to a number of well-established public blockchains [18], [20].

The limiting factor to the performance of these blockchains is the network performance between its miner/verifier nodes [20]. It simply takes some time to disseminate a new block, so that the verifiers can create its successors, rather than a fork. The block interval then is governed by the size of the block, block interval, and network performance. While one might naturally worry about block processing time, for example, in face of complex smart contracts, verifier processing speed has not been limiting factor to blockchain performance as of yet [2], [4].

To gain higher performance DLT designs follow two directions. The first direction, primarily, reduces transaction recording delay though decreasing the block interval by using smaller blocks that take less time to disseminate. The second direction, primarily, increases transaction throughput by relying on a constrained number of well-connected verifier nodes. Some blockchains combine the two approaches [21], [22].

In the first direction, when decreasing block interval, blocks can become so small as to contain only a few transactions. But a block can reference multiple (typically two) previous blocks, which forms a directed acyclic graph (DAG) [1], [21]-[23]. In a DAG, blocks at the same height in the DLT do not necessarily create a fork since bifurcations can be merged in subsequent blocks. Transaction finality sill depends on agreement among some quorum of nodes, but nodes reach agreement independently on each transaction. Independent agreement tends to speed up transaction delay, but not necessarily throughput.

In the second direction, when constraining the number of verifiers, speed of block dissemination improves through high capacity, direct connections between verifiers. A DLT may identify these verifiers through delegation or through a technique called proof-of-authority (PoA) [24], [25]. In PoA, verifiers stake their reputation to follow the protocol. Not following the protocol forfeits reputation and with it, the right to make future blocks. Unfortunately, in most systems, it is not clear how to quantify reputation.

The present invention may be characterized as a "delegated" PoA, insofar as it transfers the reputation of dependent services, such as Amazon Cognito, Amazon S3, and AWS Nitro Enclaves into a blockchain mechanism. With delegation, there are multiple metrics to quantify reputation. Examples include users, revenue, or number of projects using the service. With delegated PoA, the key observation is that, independent of the present invention, dependent services are already staking their reputation. That is, if a service such as Amazon Cognito deviates from its protocol, its reputation will sink resulting in loss of users, revenue, etc.

The key feature of delegated PoA blockchain resulting from the present invention is that its throughput depends on the performance of the network among its component services, as shown in FIG. 5. Since the component services may be all placed in the cloud, their connections can approach line speeds, which is orders of magnitude faster than the interconnects of more distributed blockchain architectures. The result is orders of magnitude higher throughput for the present invention, subject to a constant transaction finality.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method, comprising:

creating, by a processor, an alternating structure of a plurality of blocks and a first plurality of timestamp attestations, wherein a first subset of blocks of the plurality of blocks comprises a link to at least one of the first plurality of timestamp attestations of at least one preceding block of the plurality of blocks, wherein creating the alternating structure further comprises:

constructing a first data structure comprising a first set of ordered transactions corresponding to the plurality of blocks;

creating a first block of the plurality of blocks comprising a cryptographically linking root of the first data structure; and creating a first timestamp attestation over the first block;

determining, by the processor, an order of the plurality of blocks corresponding with at least one chain;

determining, by the processor, a set of blocks of the plurality of blocks on the at least one chain; and replicating, by the processor, the plurality of blocks, the first plurality of timestamp attestations, and the first set of ordered transactions.

2. The method of claim 1, wherein the first block corresponds to a second subset of blocks of the plurality of blocks, and wherein creating the alternating structure further comprises:

constructing, by the processor, a second data structure comprising a second set of ordered transactions corresponding to the plurality of blocks;

creating, by the processor, a second block of the plurality of blocks comprising a cryptographically linking root of the second data structure, wherein the second block corresponds to the second subset of blocks of the plurality of blocks;

linking, by the processor, the second block to the first timestamp attestation of the first block; and creating, by the processor, a second timestamp attestation over the second block.

3. The method of claim 2, wherein determining the order comprises:

assigning, by the processor, at least one sequence attestation of a first plurality of sequence attestations to each timestamp attestation of the first plurality of timestamp attestations.

4. The method of claim 2, wherein the first data structure is a first Merkle tree comprising the first set of ordered transactions, and wherein the second data structure is a second Merkle tree comprising the second set of ordered transactions, and wherein the first timestamp attestation and the second timestamp attestation is created using a timestamp service.

5. The method of claim 4, wherein the replicating of the plurality of blocks comprises using a replication service, and wherein replicating further comprises replicating the first set of ordered transactions of the first data structure and the second set of ordered transactions of the second data structure.

6. The method of claim 5, further comprising:

repeating, by the processor, over a series of the plurality of blocks and the first plurality of timestamp attestations, the constructing of respective first data structure comprising a respective first set of ordered transactions corresponding to the series of the plurality of blocks creating a respective first block of the series of the plurality of blocks, creating a respective first timestamp attestation over the respective first block, constructing a respective second data structure comprising a respective second set of ordered transactions corresponding to the series of the plurality of blocks, creating a respective second block of the series of the plurality of blocks linking the respective second block to the respective first timestamp attestation of the respective first block, and creating a respective second timestamp attestation over the respective second block to create the alternating structure in which each block of the first subset of blocks is linked to at least one timestamp attestation of a preceding block of a plurality of preceding blocks.

7. The method of claim 1, wherein determining the order of the plurality of blocks further comprises:

assigning, by the processor using a sequencer service, at least one sequence attestation of a first plurality of sequence attestations over each timestamp attestation of the first plurality of timestamp attestations, wherein each corresponding sequence attestation comprises a unique event identifier (ID) of a plurality of unique event IDs, wherein each unique event ID is assigned in a deterministic order; and wherein each block of the first subset of blocks of the plurality of blocks corresponds to a height creating a total order of the plurality of blocks based on the height of each block of the first subset of blocks of the plurality of blocks and the corresponding sequence attestation assigned over each timestamp attestation.

8. The method of claim 1, wherein determining the set of blocks on the at least one chain comprises:

validating, by the processor, a timestamp attestation of the first plurality of timestamp attestations over the first block of the plurality of blocks;

validating, by the processor, a sequence attestation of a first plurality of sequence attestations over the timestamp attestation over the first block; and adding, by the processor, the first block and the timestamp attestation over the first block to the at least one chain.

9. The method of claim 8, wherein:

the at least one chain comprises a last block of the plurality of blocks corresponds to a last sequence attestation, extending the at least one chain from the last block by:

finding, by the processor, a plurality of successor blocks of the last block, wherein each successor block of the plurality of successor blocks corresponds to a timestamp attestation of a second plurality of timestamp attestations, wherein each of the second plurality of timestamp attestations corresponds to the last block;

finding, by the processor, a sequence attestation of a second plurality of sequence attestations corresponding to at least one timestamp attestation of the second plurality of timestamp attestations;

identifying, by the processor, a successor block of the plurality of successor blocks of the corresponding sequence attestation being the lowest deterministic order than all other of the second plurality of sequence attestations of the plurality of success or blocks;

validating, by the processor, the corresponding timestamp attestation and validating of the corresponding sequence attestation of the successor block; and adding, by the processor, to the at least one chain the successor block from the plurality of successor blocks having the lowest deterministic order and adding the corresponding timestamp attestation over the successor block with the lowest deterministic order sequence attestation.

10. The method of claim 9, further comprising:

repeating, by the processor, the finding, identifying, validation, and adding over the set of blocks, the second plurality of timestamp attestations, wherein the first plurality of timestamp attestations comprise at least the second plurality of timestamp attestations.

11. The method of claim 9, wherein adding to the at least one chain the successor block is further based on if the plurality of blocks with the second plurality of sequence attestations between the last sequence attestation of the last block on the at least one chain and the corresponding sequence attestation of the successor block with the lowest sequence attestation is found, and wherein the at least one chain further comprises at least one fork chain.

12. A system, comprising:

a processor configured to:

create an alternating structure of a plurality of blocks and a first plurality of timestamp attestations, wherein a first subset of blocks of the plurality of blocks comprises a link to at least one of the first plurality of timestamp attestations of at least one preceding block of the plurality of blocks, wherein creating the alternating structure further comprises:

constructing a first data structure comprising a first set of ordered transactions corresponding to the plurality of blocks;

creating a first block of the plurality of blocks comprising a cryptographically linking root of the first data structure; and creating a first timestamp attestation over the first block;

determine an order of the plurality of blocks corresponding with at least one chain;

determine a set of blocks of the plurality of blocks on the at least one chain; and replicate the plurality of blocks, the first plurality of timestamp attestations, and the first set of ordered transactions.

13. The system of claim 12, wherein the first block corresponds to a second subset of blocks of the plurality of blocks, and the processor configured to:

construct a second data structure comprising a second set of ordered transactions corresponding to the plurality of blocks;

create a second block of the plurality of blocks comprising a cryptographically linking root of the second data structure, wherein the second block corresponds to the second subset of blocks of the plurality of blocks;

link the second block to the first timestamp attestation of the first block; and create a second timestamp attestation over the second block.

14. The system of claim 13, the processor configured to, in determining the order:

assign at least one sequence attestation of a first plurality of sequence attestations to each timestamp attestation of the first plurality of timestamp attestations.

15. The system of claim 13, wherein the first data structure is a first Merkle tree comprising the first set of ordered transactions, and wherein the second data structure is a second Merkle tree comprising the second set of ordered transactions, and wherein the first timestamp attestation and the second timestamp attestation is created using a timestamp service.

16. The system of claim 15, wherein the replicating of the plurality of blocks comprises using a replication service, and wherein replicating further comprises replicating the first set of ordered transactions of the first data structure and the second set of ordered transactions of the second data structure.

17. The system of claim 16, the processor further configured to:

repeat, over a series of the plurality of blocks and the first plurality of timestamp attestations, the constructing of respective first data structure comprising a respective first set of ordered transactions corresponding to the series of the plurality of blocks, creating a respective first block of the series of the plurality of blocks, creating a respective first timestamp attestation over the respective first block, constructing a respective second data structure comprising a respective second set of ordered transactions corresponding to the series of the plurality of blocks, creating a respective second block of the series of the plurality of blocks linking the respective second block to the respective first timestamp attestation of the respective first block, and creating a respective second timestamp attestation over the respective second block to create the alternating structure in which each block of the first subset of blocks is linked to at least one timestamp attestation of a preceding block of a plurality of preceding blocks.

18. The system of claim 12, wherein determining the order of the plurality of blocks further comprises:

assigning, using a sequencer service, at least one sequence attestation of a first plurality of sequence attestations over each timestamp attestation of the first plurality of timestamp attestations, wherein each corresponding sequence attestation comprises a unique event identifier (ID) of a plurality of unique event IDs, wherein each unique event ID is assigned in a deterministic order;

wherein each block of the first subset of blocks of the plurality of blocks corresponds to a height creating a total order of the plurality of blocks based on the height of each block of the first subset of blocks of the plurality of blocks and the corresponding sequence attestation assigned over each timestamp attestation.

19. The system of claim 12, wherein determining the set of blocks on the at least one chain comprises:

validating a timestamp attestation of the first plurality of timestamp attestations over the first block of the plurality of blocks;

validating a sequence attestation of the first plurality of sequence attestations over the timestamp attestation over the first block; and adding the first block and the timestamp attestation over the first block to the at least one chain.

20. A non-transitory computing device comprising a processor and memory coupled to the processor, the memory storing instructions that, when executed by the processor, causes the processor to:

create an alternating structure of a plurality of blocks and a first plurality of timestamp attestations, wherein a first subset of blocks of the plurality of blocks comprises a link to at least one of the first plurality of timestamp attestations of at least one preceding block of the plurality of blocks, wherein creating the alternating structure further comprises:

constructing a first data structure comprising a first set of ordered transactions corresponding to the plurality of blocks;

creating a first block of the plurality of blocks comprising a cryptographically linking root of the first data structure; and creating a first timestamp attestation over the first block;

creating a first sequence attestation over the first timestamp attestation;

determine an order of the plurality of blocks corresponding with at least one chain;

determine a set of blocks of the plurality of blocks on the at least one chain; and replicate the plurality of blocks, the first plurality of timestamp attestations, the first plurality of sequence attestations, and the first set of ordered transactions.

* * * * *